United States Patent
Inatani et al.

(10) Patent No.: US 6,952,834 B2
(45) Date of Patent: Oct. 4, 2005

(54) DISC CHUCKING DEVICE AND DISK RECORDING AND/OR REPRODUCING APPARATUS

(75) Inventors: Akihisa Inatani, Kanagawa (JP); Kumi Koyama, Kanagawa (JP); Hajime Mizuno, Chiba (JP)

(73) Assignee: Sony Corporation, Tokyo (JP)

(*) Notice: Subject to any disclaimer, the term of this patent is extended or adjusted under 35 U.S.C. 154(b) by 138 days.

(21) Appl. No.: 10/204,269

(22) PCT Filed: Dec. 17, 2001

(86) PCT No.: PCT/JP01/11046

§ 371 (c)(1),
(2), (4) Date: Nov. 29, 2002

(87) PCT Pub. No.: WO02/50827

PCT Pub. Date: Jun. 27, 2002

(65) Prior Publication Data

US 2003/0123376 A1 Jul. 3, 2003

(30) Foreign Application Priority Data

Dec. 20, 2000 (JP) ........................................ 2000-387581

(51) Int. Cl.⁷ ............................................ G11B 17/028
(52) U.S. Cl. ...................... 720/696; 720/706; 720/713; 720/715
(58) Field of Search ................................ 720/695, 696, 720/697, 706, 709, 710, 713, 715

(56) References Cited

U.S. PATENT DOCUMENTS

| 3,709,503 A | * | 1/1973 | Kamio et al. ............... 369/207 |
| 6,011,771 A | * | 1/2000 | Akama et al. .............. 720/711 |
| 2002/0009036 A1 | * | 1/2002 | Omori ....................... 369/75.2 |

FOREIGN PATENT DOCUMENTS

| JP | 62-103868 | | 5/1987 | |
| JP | 08190754 A | * | 7/1996 | ......... G11B/17/028 |
| JP | 10003742 A | * | 1/1998 | ........... G11B/19/20 |
| JP | 11-238278 | | 8/1999 | |

* cited by examiner

*Primary Examiner*—William J Klimowicz
(74) *Attorney, Agent, or Firm*—Oblon, Spivak, McClelland, Maier & Neustadt, P.C.

(57) ABSTRACT

A disc chucking device is provided which holds a disc-shaped recording medium on a disc table and rotates it along with the disc table. It includes a disc table whose rotation-center line is laid generally orthogonally to the vertical direction and onto which a disc-shaped recording medium is set with the main side thereof being parallel to the vertical direction, a centering block formed on the disc table and which is to be fitted in a central hole in the disc-shaped recording medium, a motor to rotate the disc table, a clamper to pinch along with the disc table the disc-shaped recording medium put on the disc table, and a fall-off preventive structure provided on the disc table for engagement with the disc-shaped recording medium at the central hole formed in the latter.

13 Claims, 13 Drawing Sheets

DISC CHUCKING DEVICE AND DISK RECORDING AND/OR REPRODUCING APPARATUS

TECHNICAL FIELD

The present invention generally relates to a disc chucking device and a disc recorder and/or player, and more particularly to a disc chucking device in which a disc-shaped recording medium is chucked with the main side thereof positioned generally parallel to the vertical direction and a disc recorder and/or player in which the disc chucking device is incorporated.

BACKGROUND ART

Conventionally, there are available disc players in which information signals are read from a disc-shaped recording medium for reproduction. Such disc players include so-called vertical or upright types in which a disc-shaped recording medium is played back with the main side of the recording medium being chucked generally parallel to the vertical direction.

One typical example of the vertical-type disc players of the above type will be described with reference to FIG. 1. To prevent a disc-shaped recording medium 101 (will be referred to as "disc" hereunder) going to be set on a disc table 103 from falling off a truncated cone-shaped centering projection 104 before it is pinched between the disc table 103 and a clamper 102, there is provided in the disc player a receiving member 105 which receives therein a part of the outer-circumferential portion of the disc 101 as shown in FIG. 1. In such a disc player, after the disc 101 is pinched or securely held between the clamper 102 and disc table 103, the receiving member 105 is moved to a predetermined position away from the disc-shape recording medium 101, the latter is rotated as the disc table 103 is rotated, and thus information signals are read from the disc 101.

In the disc player incorporating the receiving member 105 as shown in FIG. 1, however, when the disc 101 is received in the receiving member 105 and when the chucking is complete and thus the disc 101 has not to be received any longer, the receiving member 105 has to be moved away from the disc 101. To this end, in the disc player shown in FIG. 1, there should be provided a mechanism to move the receiving member 105 away from the disc 101, which will disadvantageously result in a complicated construction of the disc player and increased costs of manufacture because the moving mechanism and receiving member 105 are required.

All the disc-shaped recording media are not identical in diameter to one another. That is, for playback of all such disc-shaped recording media of different diameters by one disc player, a position to which the receiving member 105 is to be moved should be set for each of the disc-shaped recording media of different diameters, which will further complicate the construction of the moving mechanism.

Also, another typical example of the vertical-type disc players will be described with reference to FIG. 2. In the disc player, there is provided along the outer circumference of a centering projection 112 of a disc table 111 metal balls 114 which are movable radially of the centering projection 112 by a plurality of spring members 113. When setting the disc 101 in the disc player, the inner circumference of the disc 101 pushes the metal balls 114 which will thus be moved the center of the centering projection 112. When the inner circumferential edge of the disc 101 has been moved over the metal balls 114, the elasticity of the spring members 113 returns the metal balls 114 to their initial positions for engagement of the metal balls 114 on the inner circumferential edge of the disc 101, thereby setting the disc 101 onto the disc table 111.

In the disc player using the metal balls 114 as shown in FIG. 2, however, for setting the disc 101 onto the disc table 111, the disc 101 has to be moved toward the center axis of the disc table 111 in order to move the metal balls 114 toward the center of the centering projection 112, which will apply, when the disc 101 is going to be set on the disc table 114, a pressure to the disc 101 which will possibly be damaged by the pressure.

DISCLOSURE OF THE INVENTION

Accordingly, the present invention has an object to overcome the above-mentioned drawbacks of the prior art by providing a disc chucking device by which a disc-shaped recording medium can be set onto a disc table easily and correctly and a disc recorder and/or player having the disc chucking device incorporated therein.

The above object can be attained by providing a disc chucking device including according to the present invention, a disc table whose rotation-center line is laid generally orthogonally to the vertical direction and onto which a disc-shaped recording medium is set with the main side thereof being parallel to the vertical direction, a centering block formed on the disc table and which is to be fitted in a central hole in the disc-shaped recording medium, a motor to rotate the disc table, a clamper to pinch along with the disc table the disc-shaped recording medium put on the disc table, and a fall-off preventive means provided on the disc table for engagement with the disc-shaped recording medium at the central hole formed in the latter.

The above fall-off preventive means is formed from the side face of the generally truncated cone-shaped centering block, an engagement groove, a toroidal projection or from a plurality of projections.

Also the above object can be attained by providing a disc recorder and/or player including according to the present invention, a disc table whose rotation-center line is laid generally orthogonally to the vertical direction and onto which a disc-shaped recording medium is set with the main side thereof being parallel to the vertical direction, an optical pickup movable radially of the disc-shaped recording medium put on the disc table, a centering block formed on the disc table and which is to be fitted in a central hole in the disc-shaped recording medium, a motor to rotate the disc table, a clamper movable relatively to the disc table to pinch along with the disc table the disc-shaped recording medium put on the disc table, and a fall-off preventive means provided on the disc table for engagement with the disc-shaped recording medium at the central hole formed in the latter.

The above apparatus further includes means for moving the disc table and clamper in relation to each other. The moving means pinches, by means of the disc table and clamper, the disc-shaped recording medium put on the disc table while moving the disc table and clamper in relation to each other to release the disc-shaped recording medium from being pinched between the disc table and clamper.

The above apparatus further includes a support to support the clamper rotatably. The support has provided thereon means for holding the clamper when the clamper is pinching along with the disc table no disc-shaped recording medium.

These objects and other objects, features and advantages of the present invention will become more apparent from the following detailed description of the best mode for carrying out the present invention when taken in conjunction with the accompanying drawings.

BEST MODE FOR CARRYING OUT THE INVENTION

The disc chucking mechanism, and a disc player incorporating the disc chucking mechanism, both according to the present invention, will be described herebelow with reference to the accompanying drawings.

Referring now to FIGS. 3 to 7, there is schematically illustrated the first embodiment of the present invention.

Figure 1:
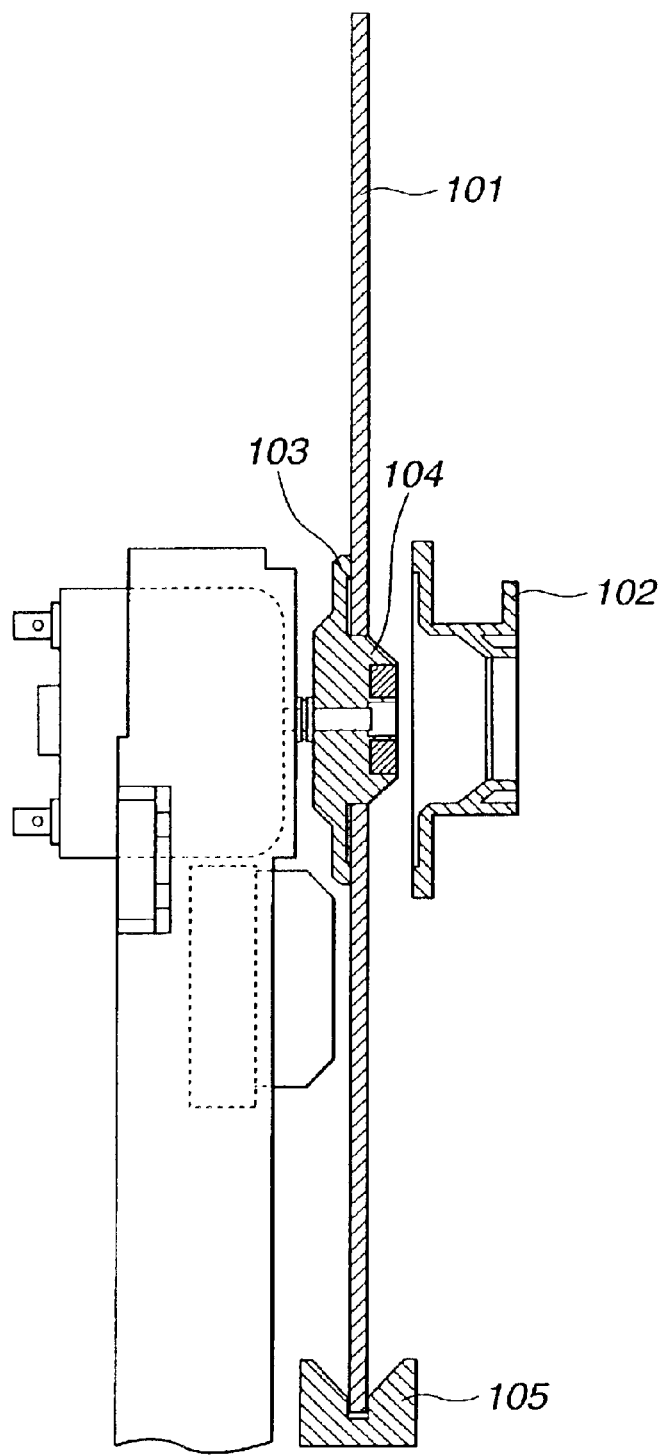
FIG. 1 shows an elevational section of one example of the disc chucking mechanism used in the conventional disc player.
Figure 2:
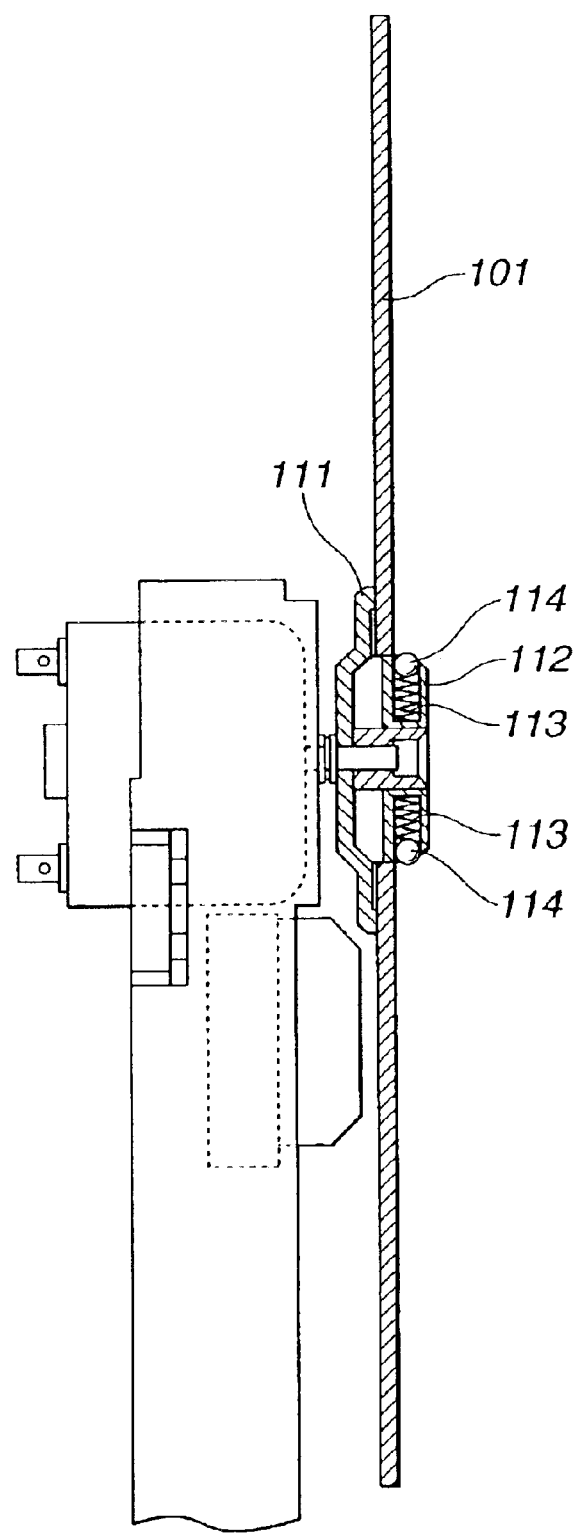
FIG. 2 shows an elevational section of another example of the disc chucking mechanism used in the conventional disc player.
Figure 3:
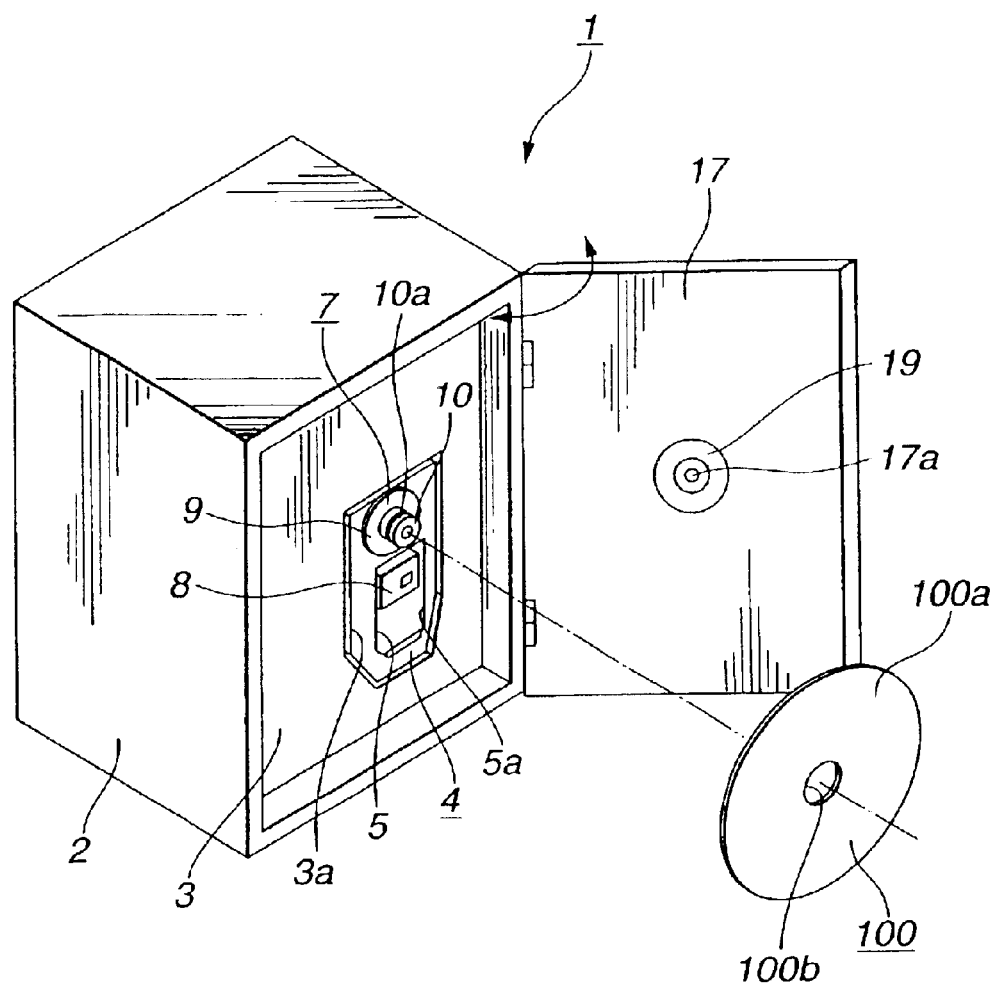
FIG. 3 is a perspective view of a first embodiment of the disc player according to the present invention.

As shown in FIG. 3, the disc player generally indicated with a reference 1 includes a cabinet 2 inside which necessary members and mechanisms are disposed. For example, the disc player 1 is of the so-called vertical or upright type in which a disc-shaped recording medium (will be referred to as "disc" hereunder) 100 is held in place with the main side 100a thereof being parallel to the vertical direction for playback thereof. The disc 100 is an optical disc such as a so-called compact disc.

As shown in FIG. 3, the cabinet 2 is open at the front thereof, and has laid therein a chassis 3 shaped correspondingly to the shape of the front opening. The chassis 3 has formed in the center thereof a vertically long hole 3a in which a base unit 4 is laid.

Figure 4:
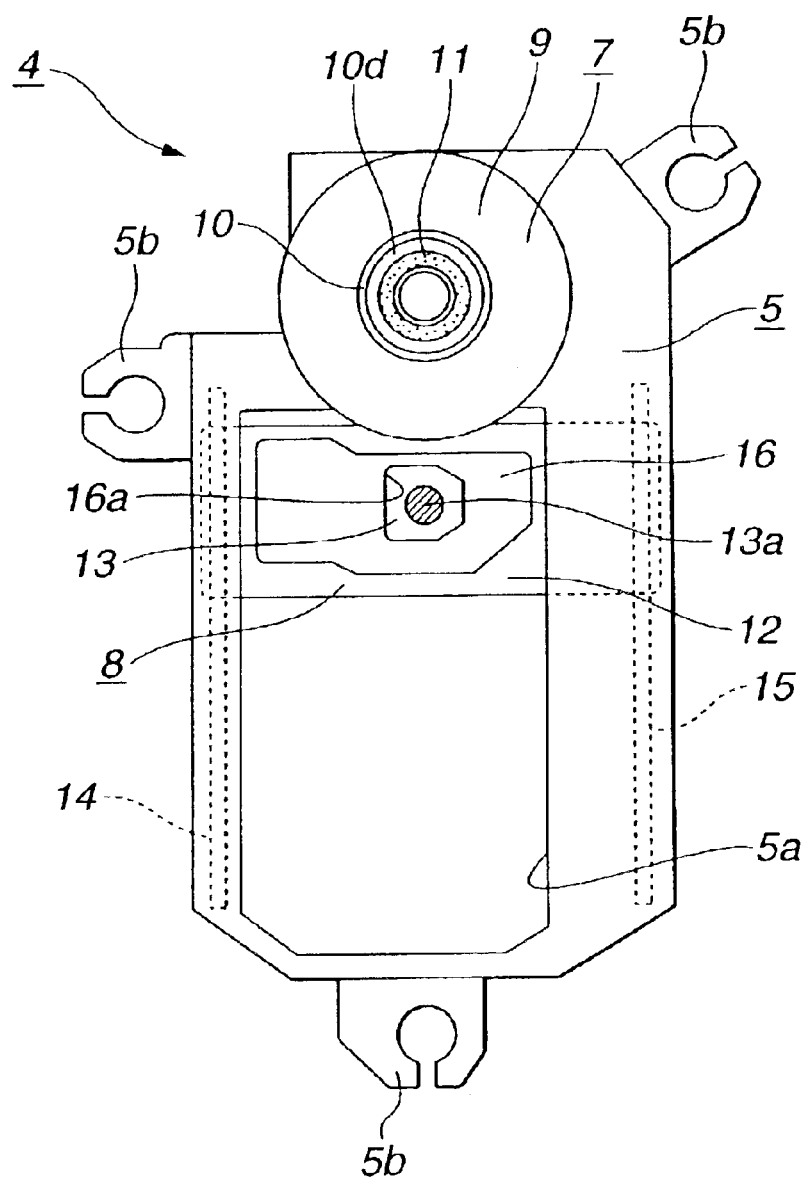
FIG. 4 is a front view of the base unit of the disc player in FIG. 3.
Figure 5:
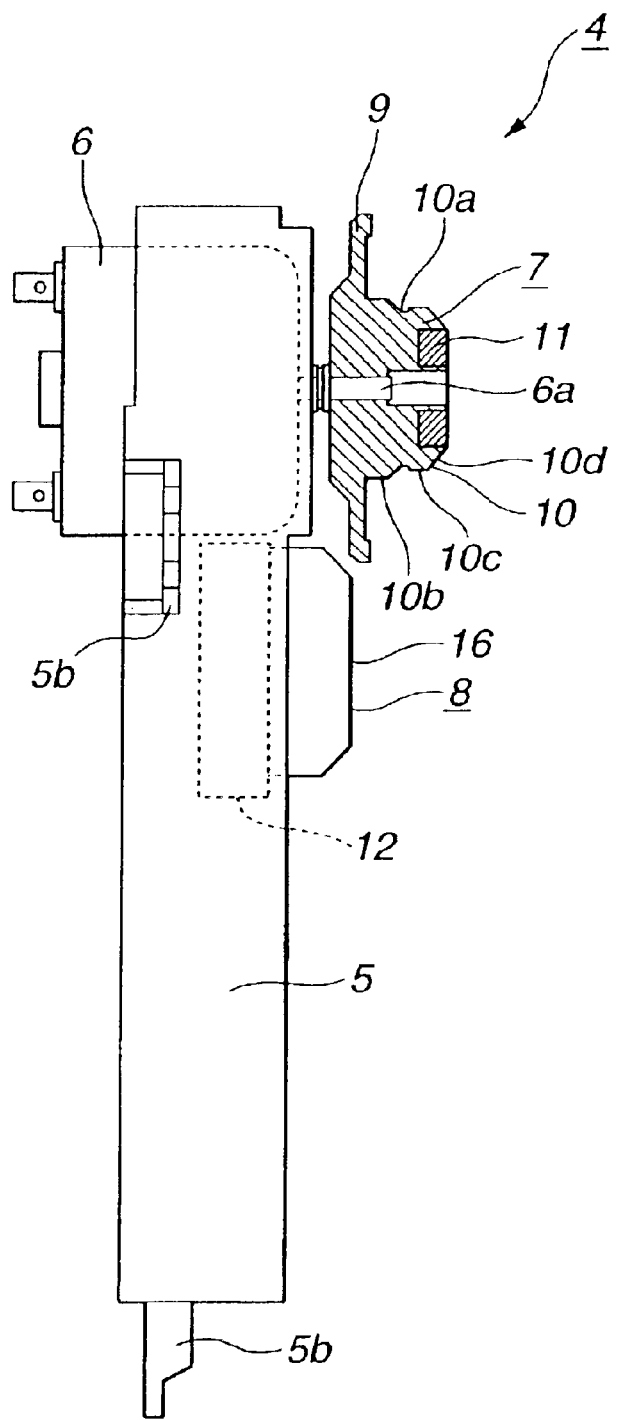
FIG. 5 shows a partial elevational section of the base unit in FIG. 4.

As will be seen from FIGS. 4 and 5, the base unit 4 includes a base member 5 having installed or supported thereto a drive motor 6, disc table 7, optical pickup 8, etc. The base member 5 is shaped to be vertically long and has a vertically long opening 5a formed in a part thereof except for the upper end portion. A plurality of fixtures 5b is projected from the periphery of the base member 5. In this embodiment, the fixtures 5b are provided at three places as shown in FIG. 4. These fixtures 5b are fixed inside the cabinet 2 or to the rear side of the chassis 3 each with a clamper member (not shown) being placed at the back thereof. Thus, the base unit 4 is laid inside the cabinet 2.

There is installed in the upper portion of the base unit 4 the drive motor 6 whose motor shaft 6a is projected forward from the base member 5 through the front opening of the cabinet 2. Namely, the motor shaft 6a of the drive motor 6 is installed in the base unit 4 in a direction orthogonal to the vertical direction.

The disc table 7 is installed at the free end of the drive shaft 6a with the rotation-center line thereof being directed generally orthogonally to the vertical direction. The disc table 7 is formed from a generally circular table portion 9 and a centering block 10 projected from the center of the table portion 9. For example, the table portion 9 and centering block 10 are formed integrally from a synthetic resin. The centering block 10 is fitted into the central hole 100b of the disc 100 which will thus be supported by the table portion 9.

The centering block 10 has a circumferentially extending engagement groove 10a formed in the perimeter thereof, namely, in the outer circumferential side face thereof nearly at the axial center. The engagement groove 10a extends all around the centering block 10. For setting the disc 100 onto the disc table 7, it is provisionally engaged at the central hole 100b thereof in the engagement groove 10a. The engagement groove 10a works as the fall-off preventive means to prevent the disc 100 not yet chucked from falling off the disc table 7.

As best shown in FIG. 5, the centering block 10 as a whole is shaped generally like a truncated cone. It consists of a base portion 10b, an intermediate portion 10c and an end portion 10d. The base portion 10b nearer to the base member 5, that is, the table portion 9 as viewed from the engagement groove 10a, has an outside diameter somewhat larger than that of the intermediate portion 10c nearer to the free end of the centering block 10 as also viewed from the engagement groove 10a. The outside diameter of the base portion 10b is generally the same as that of the central hole 100b of the disc 100. Of the centering block 10, the end portion 10d contiguous to the intermediate portion 10c and extending forward has an outside diameter which is smaller, namely, tapered, as it goes forward to the free end. That is, the end portion 10d works to guide the disc 100 to the centering block 10.

The centering block 10 has a toroidal magnet 11 fixed in a toroidal recess formed in the end face of thereof.

The disc table 7 is fixed to the motor shaft 6a of the drive motor 6 and thus driven to rotate by the drive motor 6.

The optical pickup 8 forms a reader to read information signals from the disc 100 for reproduction of the signals. It has a biaxial actuator 13 supported on a moving base 12. As shown in FIG. 4, the moving base 12 is screwed at one end thereof on a lead screw 14 supported rotatably on the base member 5, and it is supported at the other end thereof on a guide shaft 15 fixed to the base member 5. As the lead screw 14 is driven to rotate about the axis thereof by a pickup drive moor (not shown), the moving base 12 is moved along the guide shaft 15 and radially of the disc 100 set on the disc table 7. At this time, the moving base 12 is moved either towards or away from the center of the disc 100 depending upon the rotating direction of the lead screw 14.

The biaxial actuator 13 supports an objective lens 13a and moves the latter in a direction parallel to the optical axis of the objective lens 13a and also in a direction orthogonal to that optical axis. The objective lens 13a is thus caused to face the outside through a through-hole 16a formed in a case 16, that is, the disc 100 set on the disc table 7.

Figure 7:
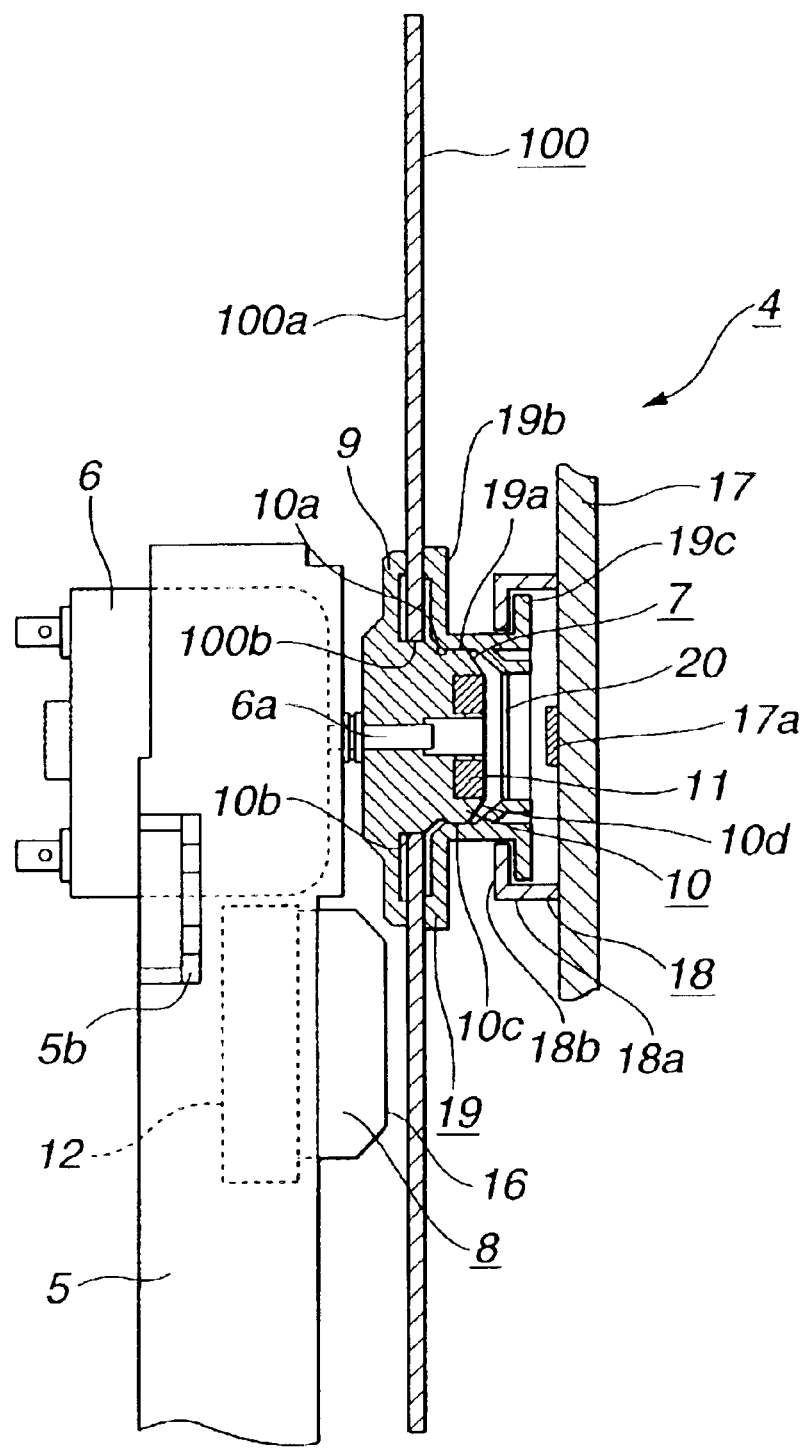
FIG. 7 shows an elevational section of the base unit in which the disc-shaped recording medium is chucked.

As shown in FIG. 3, the cabinet 2 has installed pivotably to the front end of one lateral wall thereof a cover 17 which opens and closes the cabinet 2 at the front opening. The cover 17 has a clamper support 18 provided on the inner wall thereof as shown in FIG. 7. The clamper support 18 supports a clamper 19 to be rotatable and axially movable.

As shown in FIG. 7, the clamper support 18 includes a base portion 18a which is a cylindrical projection from the cover 17 and a flange portion 18b projected inwardly from the end of the base portion 18a. The cover 17 has fixed to the inner wall thereof a magnet 17a to hold the clamper 19 inside the base portion 18a of the clamper support 18. The clamper holding magnet 17a has a magnetism weaker than that of the magnet 11 provided in the disc table 7.

The clamper 19 includes a cylindrical fit-on portion 19a, a pinching portion 19b projected outwardly from one axial end of the fit-on portion 19a, and a plurality of engagement projections 19c extending outwardly from the other axial end of the fit-on portion 19a. The fit-on portion 19a has fixed to the inner wall thereof an iron plate 20 as a magnetic member. By inserting the plurality of engagement projections 19c into the base portion 18a of the clamper support 18, the clamper 19 is rotatably supported by the clamper support 18. With the flange portion 18b being engaged on the plurality of engagement projections 19c, the clamper 19 is prevented from being disengaged from the clamper support 18. Note that the engagement projections 19c are provided at three places.

Next, there will be described how the user does for chucking the disc 100 in place in the disc player 1 by means of the disc chucking mechanism having been described with reference to FIGS. 3 to 7.

First, the user opens the cover 17 of the cabinet 2 of the disc player 1 to uncover the front opening of the cabinet 2, as shown in FIG. 3. At this time, the clamper 19 is held in a position closest to the cover 17 because the iron plate 20 is attracted by the clamper holding magnet 17a.

Figure 6:
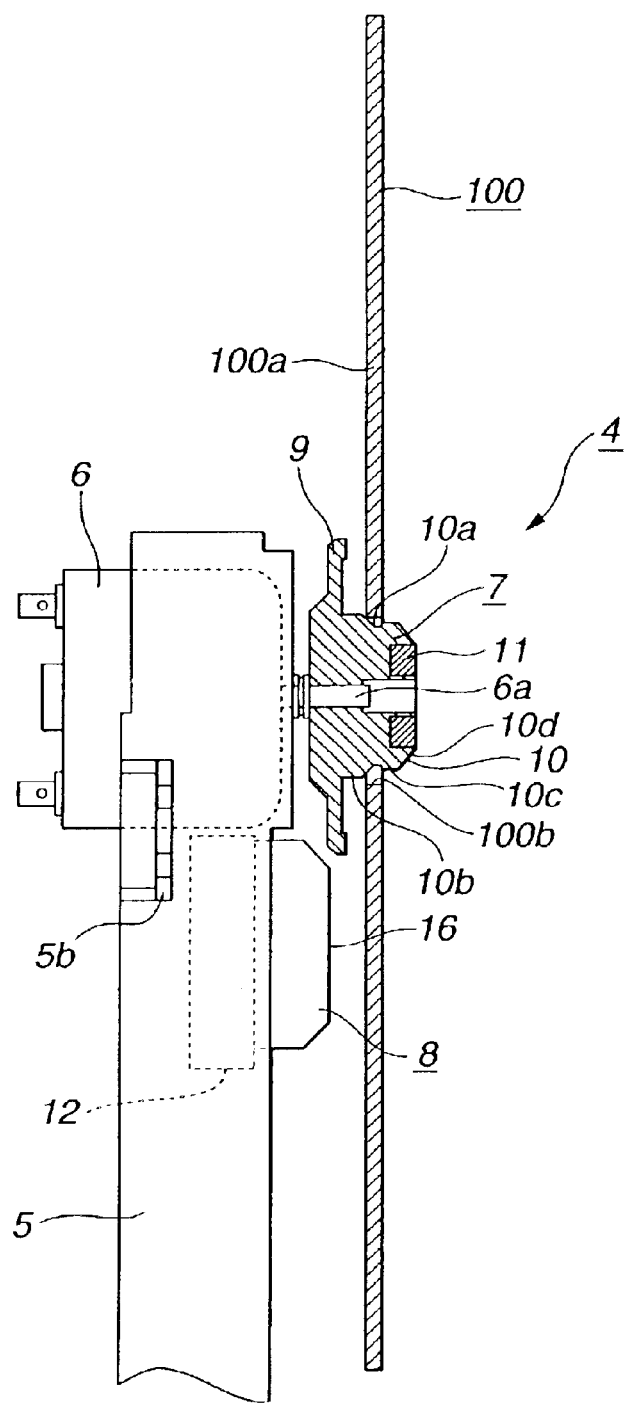
FIG. 6 shows an elevational section of the base unit in which a disc-shaped recording medium is engaged in an engagement groove.

Next, the user brings to engage the disc 100 at the circumference along the central hole 100b thereof into the engagement groove 10a on the centering block 10 of the disc table 7 as shown in FIG. 6.

Then, the user closes the cover 17 to cover the front opening of the cabinet 2. At this time, since the magnetism of the clamper holding magnet 17a is smaller than that of the magnet 11, the iron plate 20 is attracted by the magnet 11 towards the disc table 7, the inner circumference of the disc 100 is pressed towards the table portion 9 by the clamper 19 attracted by the magnet 11, the iron plate 20 is attracted by the magnet 11, and thus the disc 100 is pinched between the table portion 9 and pinching portion 19b of the clamper 19, as shown in FIG. 7. Namely, the disc 100 will be chucked in place by the disc table 7 and clamper 19.

When a play switch (not shown) provided on the disc player 1 is turned on by the user with the disc 100 chucked in place, the drive motor 6 is activated to rotate disc table 7 which will thus rotate the disc 100 and clamper 19 together. As the disc 100 is thus rotated, the optical pickup 8 is driven by the pickup drive motor (not shown) to move radially of the disc 100, laser light is projected to the signal recording surface of the disc 100 through the objective lens 13a supported by the biaxial actuator 13, focusing and tracking of the objective lens 13a are controlled by the biaxial actuator 13, and thus information signals are read from the disc 100.

After the playback of the disc 100 is complete, the user opens the cover 17 to uncover the front opening of the cabinet 2 again. At this time, the clamper 19 is separated from the disc table 7 against th magnetism of the magnet 11, namely, the disc 100 is released from the chucked state. Therefore, the user can take out the disc 100 from inside the cabinet 2. In this condition, the iron plate 20 is attracted by the clamper holding magnet 17a and the clamper 19 is held in a position closest to the cover 17.

As above, in the disc player 1 according to the present invention, the disc 100 is engaged at the central hole 100b thereof in the engagement groove 10a formed as a fall-off preventive means in the centering block 10 of the disc table 7 to prevent the disc 100 not yet chucked in place from being disengaged from or falling off the disc table 7. Therefore, there is not required any dedicated holding member to hold the disc 100 not yet chucked in place and moving mechanism to move the holding member, the internal mechanism of the disc player 1 is not complicated, the disc 100 can be chucked easily and accurately, and thus the disc player 1 can be produced at less costs.

According to the aforementioned embodiment of the present invention, any disc 100, large or small in diameter, can be chucked easily and accurately. That is, the present invention can provide a highly versatile disc player compatible with disc-shaped recording media or discs of different diameters.

Further, since the disc 100 can be chucked solely by fitting it at the central hole 100b thereof onto the disc table 7, no pressure larger than necessary will be applied to the disc 100 going to be set in or removed from the disc player 1 and thus the disc 100 will not possibly be damaged.

Furthermore, the engagement groove 10a is formed as the fall-off preventive means. By engaging the disc 100 at the central hole 100b thereof in the engagement groove 10a, the disc 100 will not easily fall off or disengage from the disc table 7. So, the disc 100 going to be set in place in the disc player 1 can be fitted onto the disc table 7 more easily. Also the disc 100 released from the chucked state for removal from inside the disc player 1 cannot easily fall off from the disc table 7. Thus, the user can remove the disc 100 easily and safely from the disc table 7.

In addition, since the engagement groove 10a is formed all around the disc table 7, the disc 100 can positively be engaged at the inner circumference thereof in the engagement groove 10a wherever the disc table 7 stops rotating.

Referring now to FIGS. 8 to 11, there is schematically illustrated the second embodiment of the present invention.

The second embodiment of the disc player according to the present invention is generally indicated with a reference 1A. It should be noted that the disc player 1A is different from the disc player 1 shown in FIG. 3 in that there is provided a carrier to convey the disc 100. So, the disc player 1A will be explained concerning only the differences from the disc player 1 shown in FIG. 3. The other parts same as or similar to those in the disc player 1 will be indicated with the same or similar references as in FIGS. 3 to 7, and will not be described in detail.

Figure 8:
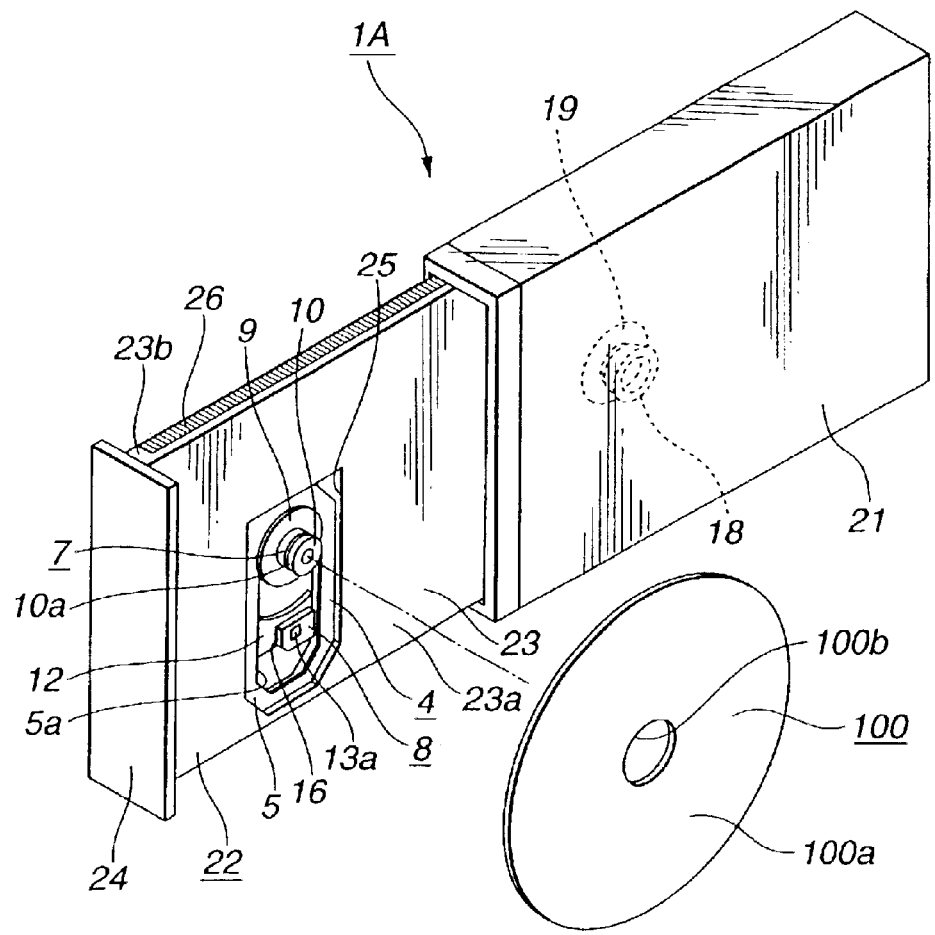
FIG. 8 is a perspective view of a second embodiment of the disc player according to the present invention.

As shown in FIG. 8, the disc player 1A includes a cabinet 21 being a thin box open at one end thereof and inside which necessary members and mechanisms are disposed. The disc player 1A is of the so-called vertical or upright type in which a disc-shaped recording medium (will be referred to as "disc" hereunder) 100 is held in place with the main side 100a thereof being parallel to the vertical direction for playback thereof.

The disc player 1A includes a disc carrier 22 to convey the disc 100. The disc carrier 22 is supported on the cabinet 21 to be slidable out of and into the cabinet 21. The disc carrier 22 includes a base body 23 on which necessary members and mechanisms are installed.

The base body 23 is for example a thin box open at the back thereof and is provided at one lateral end thereof with a cover plate 24 to close the opening of the cabinet 21.

Figure 9:
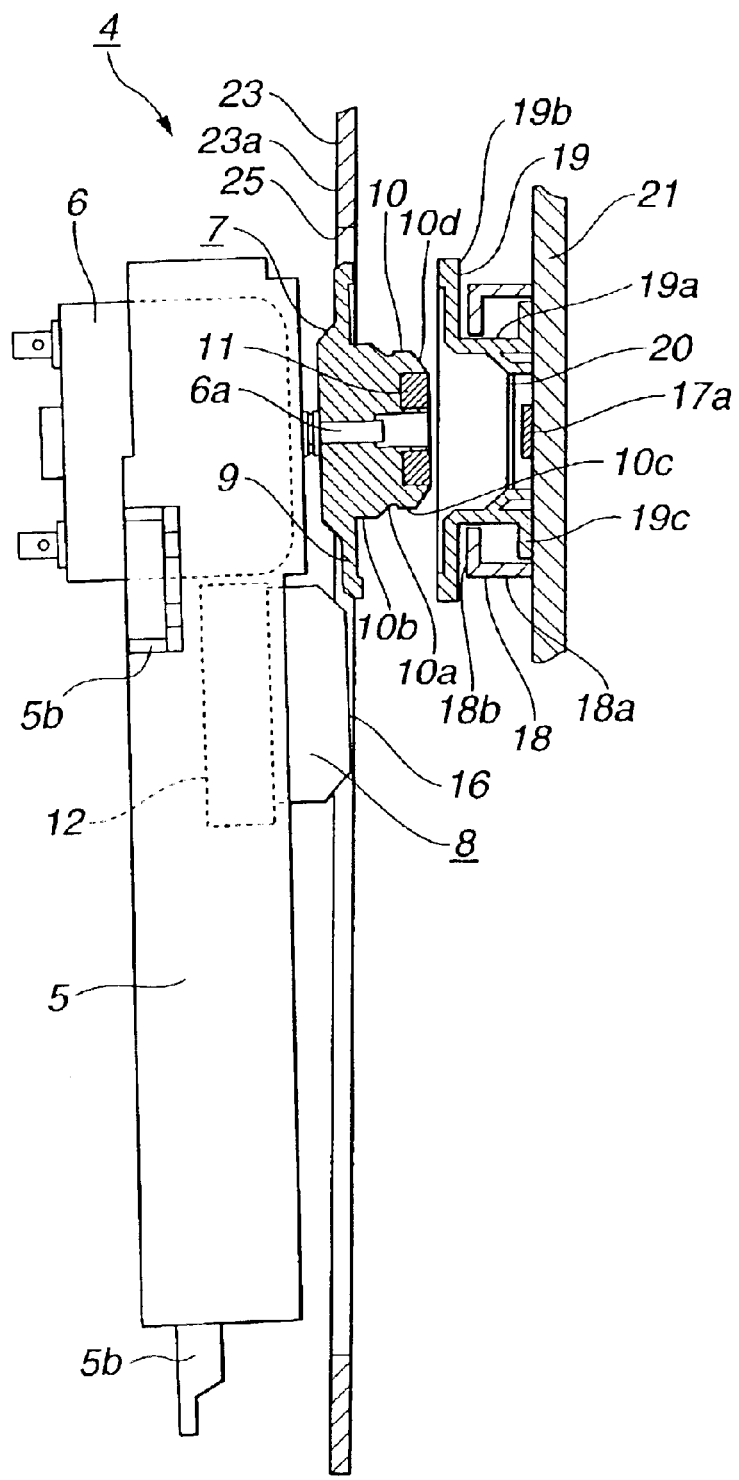
FIG. 9 shows an elevational section of the base unit and clamper used in the disc player shown in FIG. 8.
Figure 10:
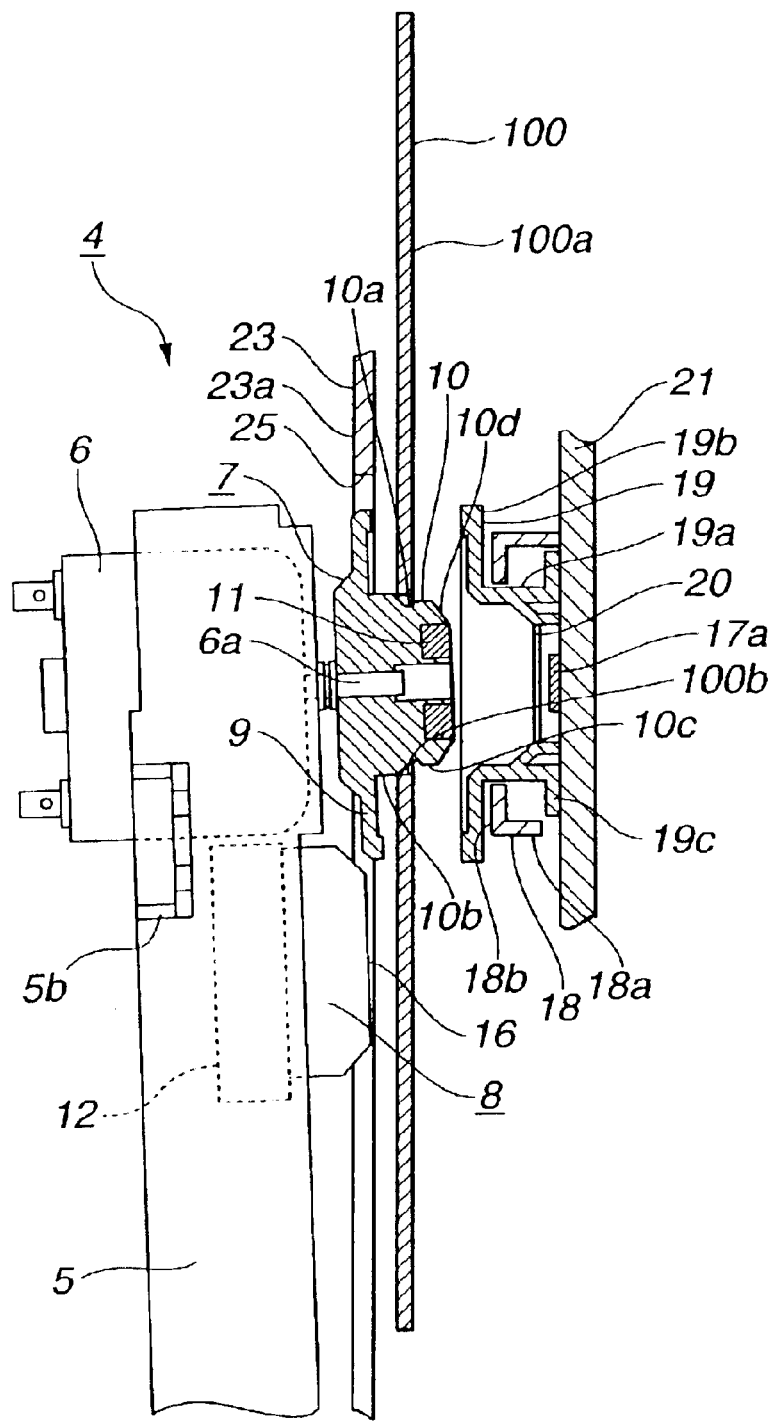
FIG. 10 shows an elevational section of the base unit in which the disc-shaped recording medium is engaged in the engagement groove.
Figure 11:
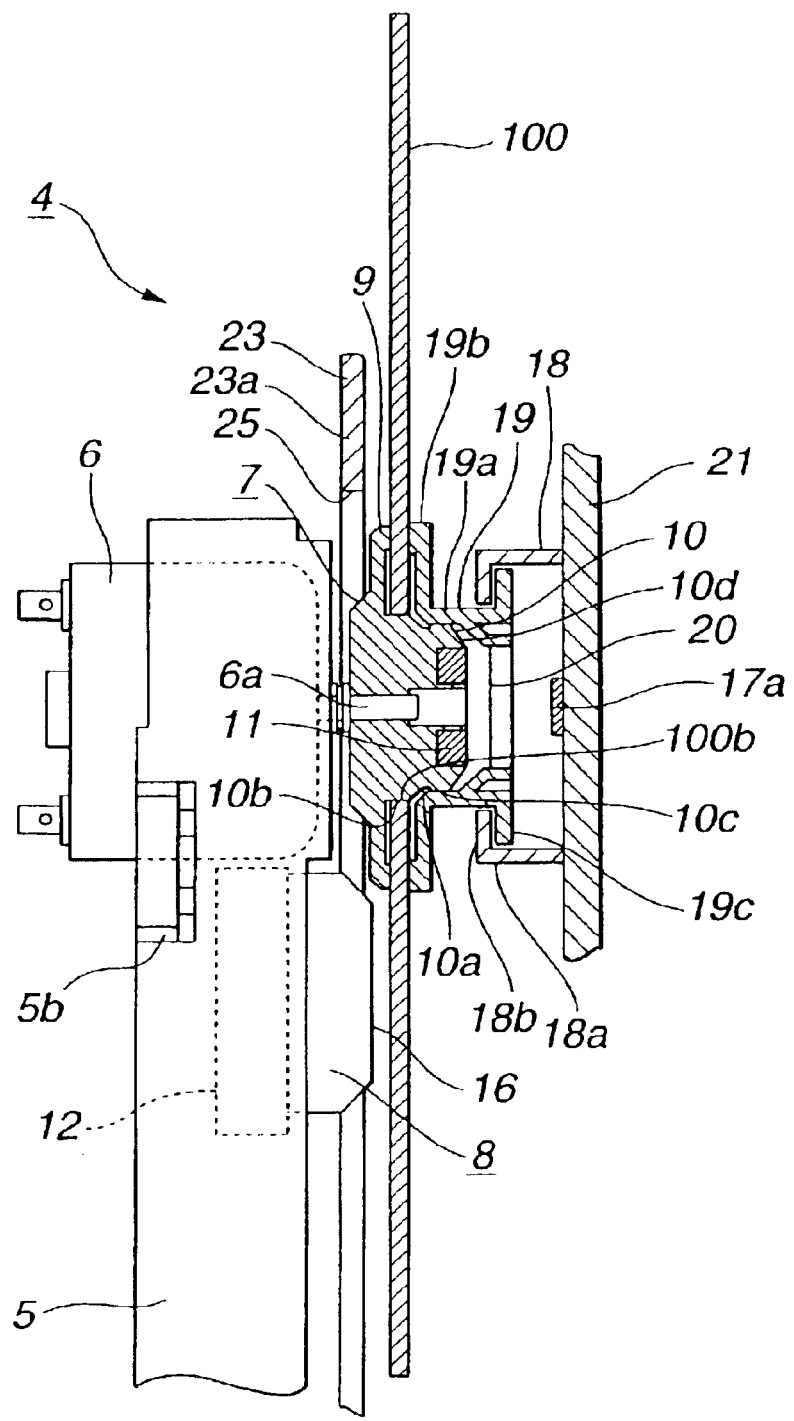
FIG. 11 shows an elevational section of the base unit in which the disc-shaped recording medium is chucked.

The base body 23 has formed in the main side 23a thereof a hole 25 in which the base unit 4 is laid. The base unit 4 has the disc table 7 projected from the hole 25. The disc table 7 is movable between a first position where it is projected a little out of the hole 25 as shown in FIG. 9 or 10 and a second position where it is projected more out of the hole 25 than in the first position as shown in FIG. 11.

The base body 23 has a rack 26 formed on one side thereof orthogonal to the main side 23a, namely, on te top side 23b, for example. The rack 26 is in mesh with a pinion of a conveying mechanism (not shown) for the base body 23, provided inside the cabinet 21. As the pinion is rotated, the track 26 is moved to bring the disc carrier 22 out of or into the cabinet 21. It should be noted that while the disc carrier 22 is being housed in the cabinet 21, the opening of the cabinet 21 is closed by the cover plate 24 of the base body 23.

The cabinet 21 has the clamper support 18 provided on the inner wall thereof opposite to the main side 23a of the base body 23. The clamper support 18 supports the clamper 19 to be rotatable and axially movable. There is provided at the inner wall of the cabinet 21 the holding magnet 17a fixed in the base portion 18a of the clamper support 18.

Next, there will be described how the user does for chucking the disc 100 in place in the disc player 1A by means of the disc chucking mechanism having been described with reference to FIGS. 8 to 11.

First, when a control switch (not shown) provided on the disc player 1A is turned on by the user, the disc carrier 22 is drawn out of the cabinet 21 by the pinion and rack 26 included in the conveying mechanism (not shown) of the base body 23 as shown in FIG. 8. When the disc carrier 22 is thus drawn out of the cabinet 21, the base body 23 is in the first position shown in FIG. 10. Then, the user brings to engage the disc 100 at the inner circumference thereof along the central hole 100b into the engagement groove 10a of the centering block 10 of the disc table 7. That is, the disc 100 can be set on the disc table 7.

Next, when the control switch (not shown) is turned on again by the user while the disc 100 is engaged in the engagement groove 10a as shown in FIG. 10, the disc carrier 22 is moved and housed again into the cabinet 21 by the pinion and rack 26 of the aforementioned conveying mechanism (not shown) of the base body 23. At this time, the iron plate 20 is attracted by the holding magnet 17a and thus the clamper 19 is held in a position farthest from the disc table 7, for example, as shown in FIG. 9. Since the disc 100 is engaged at the central hole 100b thereof in the engagement groove 10a, it will not possibly fall off the disc table 7 when the disc carrier 22 is being moved.

When the play switch (not shown) provided on the disc player 1A is turned on by the user, the base unit 4 is moved from the first position until it arrives at the second position as shown in FIG. 11. Then, the iron plate 20 is attracted by the magnet 11 and thus the clamper 19 supported on the clamper support 18 is attracted towards the disc table 7 since the holding magnet 17a has the magnetism smaller than that of the magnet 11. The disc 100 is pressed at the inner circumference thereof to the table portion 9 by the clamper 19 thus attracted, the iron plate 20 is attracted by the magnet 11, and thus the disc 100 is pinched between the table portion 9 and pinching portion 19b of the clamper 19. Namely, the disc 100 will be chucked in place by the disc table 7 and clamper 19.

When the disc 100 is chucked in place as above, the disc table 7 is driven to rotate by the drive motor 6 and the disc 100 and clamper 19 are rotated together as the disc table 7 is rotated. When the disc 100 is rotated, the optical pickup 8 is moved radially of the disc 100 by the pickup drive motor (not shown), laser light is projected onto the signal recording surface of the disc 100 through the objective lens 13a supported by the biaxial actuator 13, focusing and tracking of the objective lens 13a are controlled by the biaxial actuator 13, and thus information signals are read from the disc 100.

After that, when a stop switch (not shown) provided on the disc player 1A is turned on by the user to terminate the playback operation, the drive motor 6 is stopped, and then the base unit 4 is moved from the second position shown in FIG. 11 towards the first position shown in FIG. 10. As the base unit 4 is moved towards the first position, the clamper 19 is separated from the disc table 7 against the magnetism of the magnet 11 and thus the disc 100 is released from the chucked state. At this time, the iron plate 20 will be attracted by the magnet 17a and the clamper 19 be held in the position farthest from the disc table 7.

When the control switch provided on the disc player 1A is turned on again by the user, the disc carrier 22 is drawn out of the cabinet 21 by the pinion and rack 26 included in the aforementioned conveying mechanism (not shown) of the base body 23, as shown in FIG. 8. Thus, the user can remove the disc 100 from on the disc table 7.

There have been described the first and second embodiments (disc players 1 and 1A) in each of which the engagement groove 10a is formed as the fall-off preventive means in the disc table 7. However, it should be noted that since the engagement groove 10a may be a one in which the disc 100 is engaged at the central hole 100b thereof, it may not be any continuous one but may be formed from a plurality of engagement grooves being not contiguous circumferentially of the disc table 7, for example.

Figure 12:
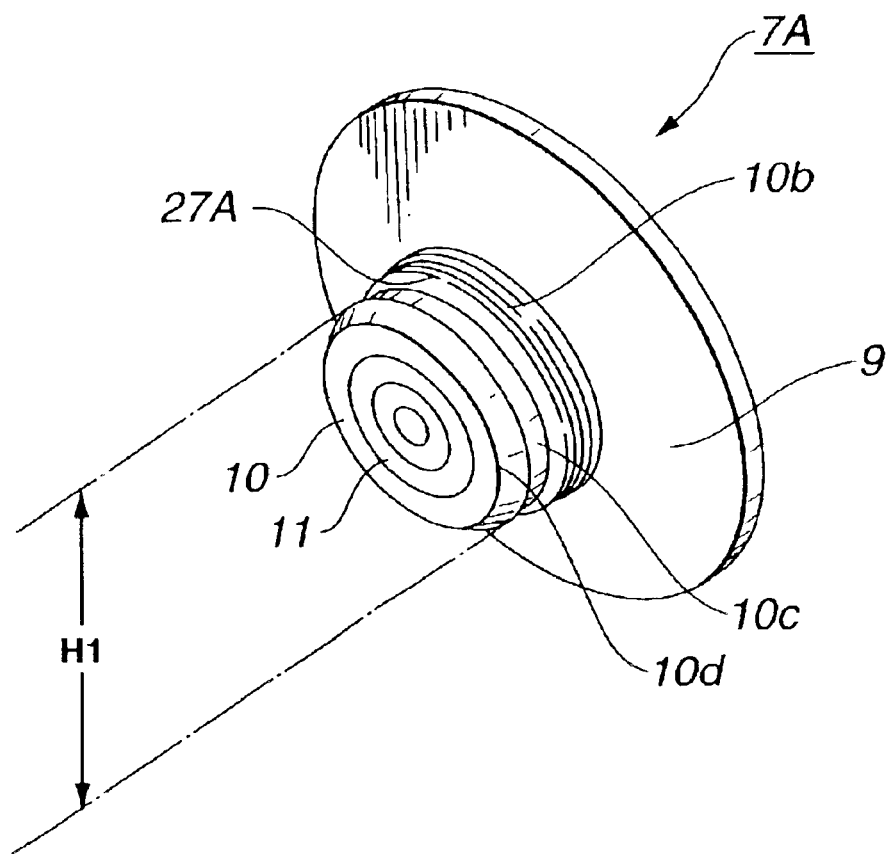
FIG. 12 is a perspective view of the disc table provided with a projection as the fall-off preventive means.
Figure 13:
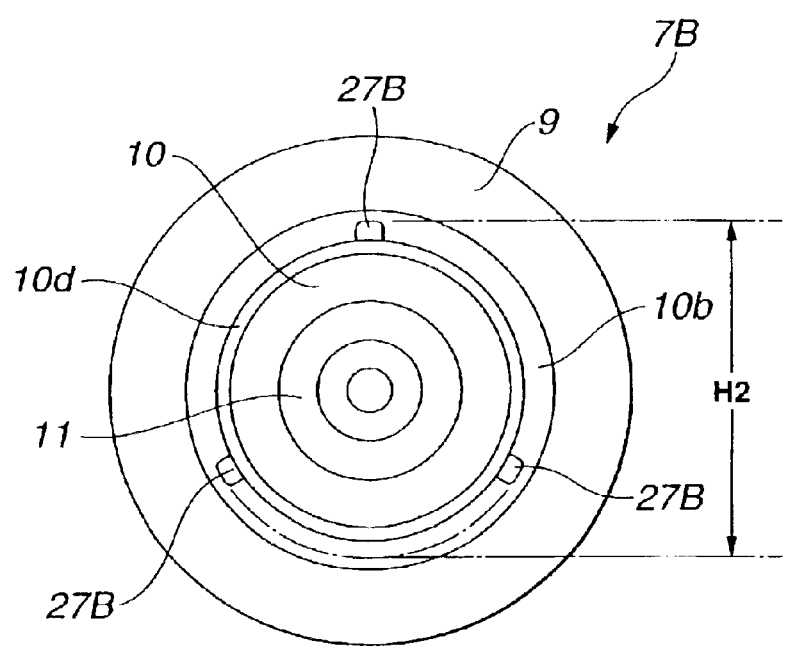
FIG. 13 shows a variant of the disc table provided with projections as the falloff preventive means.

In addition to the engagement groove 10a formed as the fall-off preventive means on the disc table 7, a projection may be formed on the disc table 7. Namely, a toroidal projection 27A is formed between the intermediate portion 10c of a disc table 7A and engagement groove 10a as shown in FIG. 12. Alternatively, a plurality of projections 27B may be formed circumferentially at predetermined intervals on a disc table 7B as shown in FIG. 13. In the latter case, the plurality of the projections 27B formed circumferentially at equal intervals on the disc table 7B should desirably be at least three in number in order to attain a positive engagement of the inner circumference of the disc 100 on the projections 27B, irrespectively of the stopping position of the disc table 7B in the rotating direction.

Note that the same or similar parts of the disc tables 7A and 7B shown in FIGS. 12 and 13, respectively, as or to those of the disc table 7 having previously been described are indicated with the same or similar references as those for the parts included in the disc table 7.

Also note that in case the projection 27A or projections 27B is provided on the disc table 7A or 7B, respectively, the outside diameter H1 of the former as shown in FIG. 12 or the diameter H2 of a circle connecting the tops of the projections 27B as shown in FIG. 13 should be smaller than the diameter of the central hole 100b in the disc 100.

In the foregoing, the present invention has been illustrated and described concerning optical disc players as the so-called vertical or upright type disc player, but the present invention is applicable to an vertical type optical disc recorder and recorder/player.

The shapes and structures of the parts included in the embodiments of the present invention have been illustrated and described just by way of example and they can of course be modified and varied without departing from the spirit and scope set forth in claims given later.

INDUSTRIAL APPLICABILITY

As having been described in the foregoing, since the present invention includes the fall-off preventive means formed on the disc table onto which the disc is to be fitted with the main side thereof being parallel to the vertical direction, and in which the disc is engaged at the central hole thereof, even the disc, not yet chucked by the clamper, can be held on the disc table. So, the disc can be fitted easily and positively on the disc table positioned vertically.

Also, since the disc can be fitted on the disc table fitted in the central hole thereof, discs of different diameters can be selectively fitted on the disc table.

What is claimed is:

1. A disc chucking device comprising:
   a disc table whose rotation-center line is laid generally orthogonally to the vertical direction and onto which a disc-shaped recording medium is set with the main side thereof being parallel to the vertical direction;
   a centering block shaped like a truncated cone and formed on the disc table, the centering block including an end portion with an oblique face, an intermediate portion which is contiguous to the end portion, and a base portion is contiguous to the intermediate portion, shaped larger than the intermediate portion and having a diameter which is to be fitted in a central hole in the disc-shaped recording medium;
   a motor to rotate the disc table;
   a clamper to pinch along with the disc table the disc-shaped recording medium put on the disc table; and
   a fall-off preventive means provided on a side face between the base and intermediate portions of the centering block for engagement with the disc-shaped recording medium at the central hole formed in the latter.

2. The apparatus of claim 1, wherein the fall-off preventive means is formed from an engagement groove.

3. The apparatus of claim 1, wherein the fall-off preventive means is formed from a toroidal projection.

4. The apparatus of claim 1, wherein the fall-off preventive means is formed from a plurality of projections.

5. A disc recorder and/or player comprising:
   a disc table whose rotation-center line is laid generally orthogonally to the vertical direction and onto which a disc-shaped recording medium is set with the main side thereof being parallel to the vertical direction;
   an optical pickup movable radially of the disc-shaped recording medium put on the disc table;
   a centering block shaped like a truncated cone formed on the disc table, the centering block including an end portion with an oblique face, an intermediate portion contiguous to the end portion, and a base portion contiguous to the intermediate portion, shaped larger than the intermediate portion and having a diameter which is to be fitted in a central hole in the disc-shaped recording medium;
   a motor to rotate the disc table;
   a clamper movable relatively to the disc table to pinch along with the disc table the disc-shaped recording medium put on the disc table; and
   a fall-off preventive means provided on a side face between the base and intermediate portions of the centering block for engagement with the disc-shaped recording medium at the central hole formed in the latter.

6. The apparatus of claim 5, wherein the fall-off preventive means is formed from an engagement groove.

7. The apparatus of claim 5, wherein the fall-off preventive means is formed from a toroidal projection.

8. The apparatus of claim 5, wherein the fall-off preventive means is formed from a plurality of projections.

9. The apparatus of claim 5, further comprising means for moving the disc table and clamper in relation to each other;
   the moving means pinching, by means of the disc table and clamper, the disc-shaped recording medium put on the disc table while moving the disc table and clamper in relation to each other to release the disc-shaped recording medium from being pinched between the disc table and clamper.

10. The apparatus of claim 9, further comprising a support to support the clamper rotatably;
    the support having provided thereon means for holding the clamper when the clamper is pinching along with the disc table no disc-shaped recording medium.

11. The apparatus of claim 10, wherein the holding means is formed from a magnet.

12. The apparatus of claim 11, further comprising a magnet provided at the end of the disc table to attract the clamper when pinching the disc-shaped recording medium by means of the disc table and clamper;
    the magnet having a greater magnetism than the holding magnet.

13. The apparatus of claim 11, wherein the clamper is provided with a magnetic member which is attracted by the holding magnet.

* * * * *